(No Model.)
W. TAYLOR.
NAIL OR SPIKE.
No. 472,913. Patented Apr. 12, 1892.
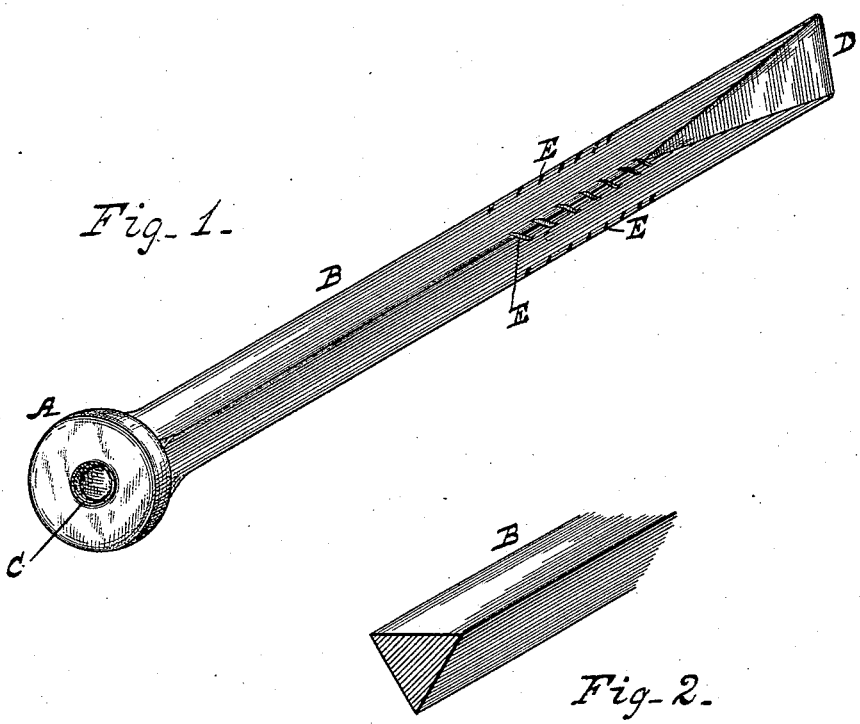
Witnesses:
Josiah W. Olls
Jas. I. Bell
Inventor.
William Taylor.

UNITED STATES PATENT OFFICE.

WILLIAM TAYLOR, OF ALLEGHENY, PENNSYLVANIA.

NAIL OR SPIKE.

SPECIFICATION forming part of Letters Patent No. 472,913, dated April 12, 1892.

Application filed April 9, 1888. Serial No. 270,151. (No model.)

*To all whom it may concern:*

Be it known that I, WILLIAM TAYLOR, a citizen of the United States, residing at Allegheny, in the county of Allegheny and State of Pennsylvania, have made a new and useful Improvement in Nails or Spikes, which will be readily understood from the following description, taken in connection with the accompanying drawings, wherein—

Figure 1 represents a perspective view of my improved nail or spike; Fig. 2, a cross-sectional portion of the shank of the nail or spike.

My invention relates to a nail or spike having a body or shank of triangular form; and the improvement I have made consists in the production of a three-cornered nail or spike having an indented head, a chisel-shaped point, and a series of transverse or diagonal nicks, notches, or serrations in and along one or all of its angular edges; also, outwardly-curved triangular shoulders underneath the head, forming part of the same.

The object of my invention is to produce a nail or spike possessing great strength and stiffness that will drive easily and hold tenaciously. This nail or spike I prefer to make of steel and give the head A any desirable shape or form. The body or shank B is three-cornered or triangular in transverse section, which shape gives a maximum degree of strength and stiffness in proportion to its weight. The three corners of the shank B are parallel with each other but are slightly spread or swelled where they join the head, so as to give increased strength at that part. Centrally in the top of the head is a small cavity or depression C, which serves to receive the end of a "set punch" and prevent its slipping from the head when used to drive or force the same beneath the surface of any wooden object. That end of the nail most remote from its head is wedge-shaped, produced by a gradual flattening of a portion of one of the angular corners of the shank down to meet an approaching inclined portion of the opposite flat side of the nail until the converging inclines come together and form a chisel-edge D, corresponding to the width of the nail. The three corners or angular edges of the shank are provided with a series of nicks E, arranged diagonally to its axis, leaving the flat sides of the nail between them perfectly plain, and these nicks may be extended the entire length of the shank on one or all of its corners.

As nails and spikes are generally used for fastening two or more pieces of wood together by passing entirely through one piece into the other, there is no necessity for having the nail nicked or roughened, except at that part entering the secondary piece of wood.

I am aware that nails and spikes having a triangular shank have been in use. I am also aware that nails having a three-cornered shank with nicks along the flat sides thereof are not new; also, that such nails were provided with a conical point. Therefore I claim no such construction; but I do claim—

1. As a new article of manufacture, a headed nail or spike having a triangular shank provided with a chisel-point and with outwardly-curved triangular shoulders underneath the head, forming part of the same.

2. A nail or spike having a three-cornered or triangular shank, a point of suitable form, and a head provided with a cavity or central depression.

WILLIAM TAYLOR.

Witnesses:
 JOSIAH W. ELLS,
 JAS. G. BELL.